Figure 1:
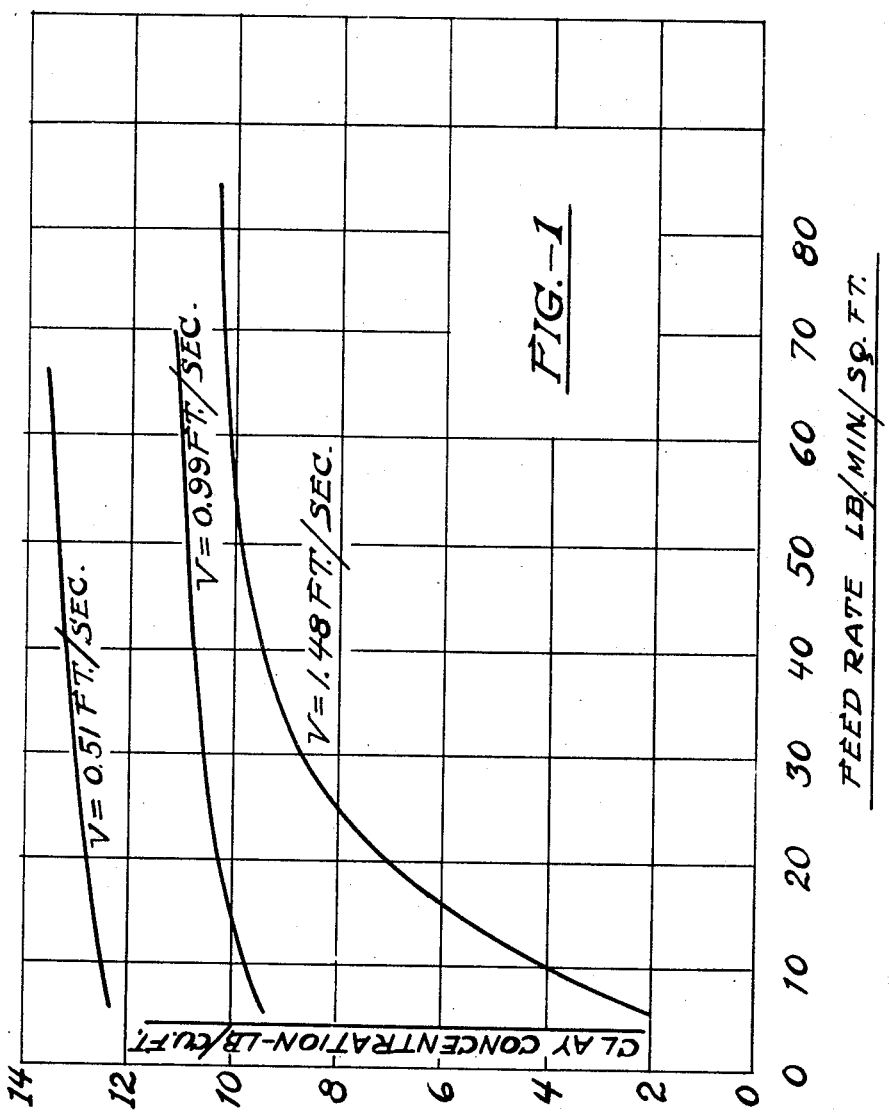

Feb. 21, 1950        W. K. LEWIS ET AL        2,498,088
CONVERSION OF HYDROCARBONS WITH SUSPENDED CATALYST
Original Filed Jan. 3, 1940        3 Sheets-Sheet 3

Warren K. Lewis
Edwin R. Gilliland Inventors
By P. J. Whelan Attorney

Patented Feb. 21, 1950

2,498,088

UNITED STATES PATENT OFFICE 2,498,088

CONVERSION OF HYDROCARBONS WITH SUSPENDED CATALYST

Warren K. Lewis, Newton, and Edwin R. Gilliland, Arlington, Mass., assignors to Standard Oil Development Company, a corporation of Delaware Original application January 3, 1940, Serial No. 312,200. Divided and this application October 23, 1945, Serial No. 624,044

7 Claims. (Cl. 196—52)

This invention relates to an improved method and apparatus for the treatment of gaseous fluids with solid materials and more particularly to a method and apparatus adapted for the conversion of hydrocarbon oils in the presence of solid catalysts.

This application forms a division of application Serial No. 312,200, filed January 3, 1940, now abandoned.

It has long been recognized that if a gas be made to flow upwardly through a bed of granular, finely subdivided solid particles, the bed is converted into a kind of quicksand, with the surface of the solid mass having the appearance of a boiling liquid; i. e., the lifting effect of the rising gas imparts to it a high degree of mobility, making it resemble a liquid to such an extent that the analogy between it and the liquid state has been heavily stressed. (See Martin, Chemical Engineering, 1928, Crosby, Lockwood and Sons, London, section 31, p. 1; et seq.). Furthermore, it has been recognized that the maintenance of this condition of mobility in a bed of solid granules offers excellent conditions for interaction of a gas with a solid, as in the conversion of coal into producer gas, the catalysis of various gas reactions by solid catalysts, etc. It offers the advantages of (1) an enormous surface of contact between solids and gases per unit volume of reaction vessel, (2) a correspondingly large reaction capacity per unit volume of reactor and (3) the dampening effect on any heat liberated or absorbed by the reaction of the high heat capacity of the suspended particles, minimizing the temperature changes that would otherwise occur. However, it has been found that this condition of operation has the following disadvantages which are so serious that it is useful only under exceptional circumstances.

(1) The velocity of the gas rising through the bed must be kept relatively low, as otherwise the gas will blow the bed up and out of the reactor. It is true, that this gas velocity can be increased by using a bed of particles of large size, but this inherently defeats one of the major advantages of the method, i. e., the provision of large surface area of the particles per unit volume of the reactor. This fact means that the gas-treating capacity per unit volume of the reactor is of necessity low. The attempt has been made to correct the condition by the introduction of a considerable portion of the gas above the surface of the bed of granules, but directed downward toward it and into it. Obviously, however, this is merely an ameliorating expedient. Because of these difficulties the use of such a unit is advantageous only in those cases in which the reaction rate desired requires an enormous solid surface per unit volume of gas reacted and the capacity of the equipment is limited by the amount of this interfacial surface.

(2) This condition of operation almost necessitates the use of granules of substantially uniform particle size. Otherwise, there is a marked tendency for the heavier particles to settle to the bottom and the lighter ones to rise on top. Moreover, the gas velocity must be kept down to a value which will prevent the blowing over of any signicant portion of even the finest particles in the mass, since this would not only reduce the solids in the bed but eliminate those particles with the largest surface per unit volume.

(3) It is true that the bed of granules can be rendered mobile by air velocities well below those at which the bed can still be maintained without serious "evaporation" into the gas stream, i. e., blowing overhead with the gas, but this obviously results in low gas treating capacity per unit volume of the reaction space and this condition also tends to give poor mixing of the bed, due to formation of chimneys through which the gas rises, surrounded by dead areas of bed.

In the effort to secure the advantages of this general type of interaction of gas with solid particles, but to avoid these limitations, the operation has been modified by constricting the cross section of the reaction chamber and flowing the gas at a correspondingly higher velocity through it. Doing this eliminates the presence of a "liquid" bed of particles, the particles being carried at a fairly high rate overhead with the gas and necessitating separation from it. Furthermore, the particles travel through the apparatus so quickly that they almost never have time to secure the desired stoichiometrically complete interaction with the gas, so that the separated particles must often be returned to the reaction zone. This general condition of operation can greatly increase the gas throughput per unit volume of reaction space, but it also results in a very great decrease in concentration of solid granules in the reaction space, because these granules, instead of resting in it as a quite compact mass, are blown out with the gas. It is true that on the average the gas always moves somewhat faster than the solid particles, so that the concentration of solids in the reactor is higher than that in the gas stream entering the reactor, but none the less under ordinary conditions of operation the solid concentration in the reactor itself is low. This method of operation is advantageous in certain cases, especially in those cases in which the amount of contact of the gas with the solid surface desired is small, as in the case of very active catalysts, or catalysts which are not only active, but, if allowed to remain in contact with the gas after the desired reaction is ended, induce undesirable reactions. However, this technique of operation likewise possesses the following serious disadvantages:

(1) Because the concentration of solids in the reaction space is low, and the surface area per unit volume drops, capacity is very low in those cases where the extent of the reaction is limited primarily by the amount of interfacial reaction surface available. In such cases one must use long, tall reaction vessels to get the requisite interfacial area and capacity.

(2) This method of operation results in a segregation of the particles of varying size in the feed which is far more serious than that in the "liquid phase" type of operation discussed above. The fine particles blow through very rapidly, whereas the coarse ones lag behind and stay in the reaction chamber a much longer time. This is exactly opposite to what is desired, since the fine particles have the larger area per unit volume.

(3) Because, despite the lag of the solid particles behind the gas, both solid and gas flow quite progressively through the reaction space, any reaction heat effects developed tend to affect the temperature at different points in the reaction vessel in different degree. Thus, in the case of a reaction which evolves heat progressively, the temperature will be low at the entrance to the reaction zone and high at its exit. On the other hand, very often a reaction of this type will not start (kindle) unless the temperature is brought up to a certain level, which is often quite near that at which it is desired to operate. This makes it necessary to preheat the materials entering the reactor. In those frequent cases in which excessive temperature rise must be avoided, temperature control must be provided in the reaction space, and moreover it must be of such a character that it can be excised independently in the various zones of the reactor. This causes complications in reactor design and operation.

It has now been discovered that by proper control of the operation of a unit of this general type, one can secure in large degree the advantages of both types of operation just described, and at the same time eliminate or greatly reduce the disadvantages. If one will operate at a gas velocity sufficient to blow all or substantially all of the solid material out of the reactor in a relatively short time, provided no fresh solid material be introduced during this time, but will feed into the reactor simultaneously solid material at a sufficiently high rate, one can maintain in the reactor a high concentration of solid granules approaching that of the 'liqud state" described above, and yet be blowing the solid particles out the top of the reactor at a corresponding rate. In other words, operating conditions should be used in which solid concentrations approach those of a mobile "liquid" mass condition, but gas velocities are sufficient to carry all solid particles overhead in the gas stream. This is secured by using an adequately high ratio of rate of feed of solid particles to rate of feed of gas or vapor to the reactor. This method of operation provides the following advantages:

(1) While the high gas velocity employed induces turbulence, the high concentration of solid particles results in a very violent mixing action in the reaction mass. In consequence, extraordinary uniformity in temperature is maintained. This is partly due to the violent mixing and partly due to the fact that the heat capacity of the solids absorbs any locally generated heat or supplies locally consumed heat. The temperature uniformity is greater than that in ordinary "liquid phase" operation and far superior to that of the high velocity operations hitherto employed.

(2) Because of this mixing effect, the necessity of bringing entering materials to reactor temperature, e. g., to preheat them, is greatly reduced. Even though, for example, the gas enters far below kindling temperature, it will be raised by mixing to reactor temperatures so quickly that there is no serious lag in getting the reaction started. Indeed, the introduction of cold gas into a reactor in which heat is evolved affords an excellent method of temperature control of the reactor.

(3) Heat can be abstracted from the reacting constituents at any temperature level desired, with no need of point control of the amount of heat abstraction within the reaction vessel. Thus, gas, or solid, or both, leaving the vessel can be cooled and recycled as a means of control within the vessel. Heat exchanger tubes or units of other suitable shapes may be placed in the reaction zones and heating or cooling fluids circulated therethrough to supply heat to, or withdraw heat from, the mixture in the reaction zone. The extreme turbulence accompanying operations according to this invention, aided by the rapidly moving solid particles, renders such heat exchanger surfaces exceptionally efficient.

(4) Even localized overheating of reacting constituents can be minimized. Thus, in the regeneration of spent oil cracking catalysts by oxidation of combustible impurities, the temperature rise at points of combustion can be so great as to seriously reduce the activity of the catalyst. However, under readily attainable concentrations of catalyst and oxidizing gases, it is easy to hold the maximum temperature rise within limits of 50° to 100° F., greatly facilitating control of the regeneration.

(5) Operation under this condition minimizes segregation of fine particles from coarse in the suspended granular mass. Apparently the coarse particles act as a sort of filter for the fines, holding them back and slowing up their ejection from the reactor in the gas stream. This greatly helps effective utilization of the fine particles in reaction.

While the rate of supply of the solid material will vary with its density and with the velocity and viscosity of the gas, the solid material should be supplied to the treating zone at a sufficient rate to maintain a concentration of at least about 3% by volume of solid material in the mixture of such solids and gases in the treating zone. Solid concentrations as high as 10% to 15% by volume and even somewhat higher may be used in this invention. Where mixtures of gases or of normally gaseous materials and vaporized liquids are used, the total gases and vapors are considered as "gas" for the purpose of this invention.

In order to illustrate suitable conditions for carrying out the process of this invention, the following example is given:

Example

A series of tests were conducted in which air was blown up through a cylindrical chamber and a pulverized acid activated clay was supplied to the bottom of the chamber. This clay powder contained particles of widely varying size, the finest being very small (below 5 microns), and also some very coarse particles. The specific gravity of the particles was about 2.4. When starting with even a small portion of the chamber filled with clay, a rising stream of air at normal temperature and pressure and at a linear velocity of approximately 0.3 ft./second quickly blows half the clay out of the chamber, with substantial segregation of the finer particles. If, on the other hand, clay is fed into the bottom of the chamber continuously at a rate of 10 lbs./minute/square foot of horizontal cross section of the chamber, even with a gas velocity of 0.51 ft./second, the clay concentration in the chamber is maintained continuously at 12.5 lbs./cu. ft. Furthermore, this clay powder will be overflowing out of the top of the chamber continuously at the rate at which it is fed into it and under these conditions of steady flow and high clay concentration the segregation of fine particles from coarse ones is negligible.

Figure 2:
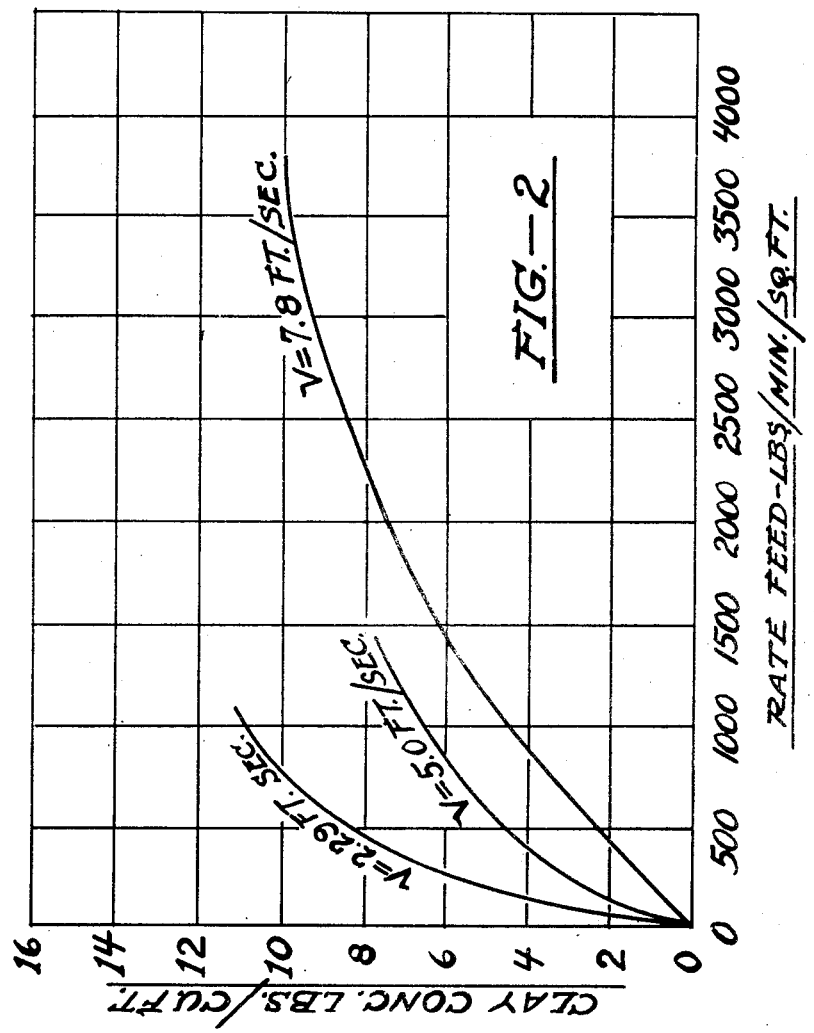

Figures 1 and 2 of the drawings contain curves indicating the solid concentration in the chamber at different gas velocities and solid feed rates. These curves represent the average of numerous determinations. Referring to Fig. 1, it will be seen that if the gas velocity be raised to 1.48 ft./second, a clay feed rate of 53 lbs./minute/sq. ft. is necessary to maintain a solid concentration of 10 lbs./cu. ft. If the gas velocity be still further increased, high clay concentrations can still be maintained but the clay feed rate must be very greatly increased as shown in Figure 2. Thus, at 2.29 ft./second gas velocity, nearly 800 lbs./minute/sq. ft. of clay must be fed to maintain a clay concentration of 10 lbs./cu. ft. in the chamber, whereas at a gas velocity of 7.8 ft./second a clay feed rate of nearly 3800 lbs./minute/sq. ft. is necessary to maintain the same concentration of solids. In all these cases, the clay will be overflowing out of the chamber at a rate equal to the feed. If the gas is shut off, the clay used in these tests settles to about 35 lbs./cu. ft. apparent density.

While concentration of solids in the treating chamber can be held high at a given feed rate and a properly chosen moderate gas velocity, the clay is completely kicked up by increasing the gas velocity a few fold. In other words, the treating chamber conditions can be maintained with no complications in the feed channels by contracting the section of the treating chamber at its bottom to say ¼ or ⅕ its normal area and introducing the gas upwardly through this restricted section. The solids will penetrate down into such a section but will promptly be kicked up. The depth of downward penetration of solids depends upon the degree of constriction and to a lesser extent upon the concentration of catalyst in the reaction space. Constriction to one-fourth the area at the bottom of the treating chamber may require a constricted section 20 to 30 diameters in length to reach a point where no catalyst penetrates, but a further constriction greatly reduces this penetration. The constriction should be gradual as otherwise there will be dead spaces in the treating vessel where accumulation of solids will occur. Venturi expander section standards have been found satisfactory for this purpose. Therefore, it is desirable to keep the angle of divergence of the constricted section below about 7°. With large angles, solids are likely to accumulate even on the sides of the expander section itself. Since a treating vessel of reasonable dimensions, having a single expander section below it would be inordinately long, a grid containing a plurality of expander sections is desirable for the bottom of the treating vessel. In order to avoid dead space in the treating vessel, the top of the individual expander sections should be square and the grid should be constructed with the upper edges of adjacent expander sections contiguous. The expander sections may be progressively converted to a circular section as the area is restricted to the throat. The throat of each expander section should be at least about 10 to 20 diameters in length.

Although it is generally preferred to supply the solid catalyst to the lower part of the treating zone, the extreme turbulence obtained with this invention permits the introduction of the catalyst to any part of the treating zone below the top thereof. The catalyst may be supplied separately from the gas or in admixture with a part or all of the gasiform material used. It is desirable to supply at least part of the gas at the lowest part of the treating zone to avoid settling out of catalyst.

While it is obvious that this invention in its broader aspects has a very general application in the catalysis of gas reactions by solid catalysts and in the reaction of gases with solids which may also simultaneously exercise a catalytic function, it is of particular advantage in the catalytic treatment of hydrocarbons and in the regeneration of solid catalysts and absorptive materials used in the conversion and refining of hydrocarbons.

A preferred embodiment of this invention is its application to the catalytic conversion of hydrocarbons, especially of crude petroleum oils and fractions thereof in which the oil is subjected in vapor phase to contact with particles, preferably finely divided, of catalytic materials under selected conditions for the conversion of such oils into motor fuel products of high anti-knock value. Suitable catalytic materials for this process are the activated clays and synthetic silica-alumina catalysts with or without added promoters. Solid material used in the application of this invention to hydrocarbon conversion should be in a powdered or pulverized state, the coarsest particles preferably passing through a screen of about 10 to 100 mesh. More finely ground powders are preferred, the major portion of which passes through a screen of 200 or 400 mesh or even finer.

The cracking catalysts gradually decrease in activity in such a process due to the deposition of carbon from materials being cracked. The catalyst is then regenerated by suitable treatment to remove carbonaceous materials, as by bringing the spent or partially spent catalyst into contact with oxidizing gases at a suitable temperature for the combustion of the carbonaceous materials deposited on the catalyst. A further modification of the process and apparatus of the present invention involves their use for the regeneration of powdered catalysts. Such catalysts may have undergone a loss in activity resulting from their use in any catalytic reaction or treating process involving a change in the nature of the catalyst or the deposition of materials on the catalyst of such nature that the catalyst may be returned to its original, active form by treatment with regenerating gases. In carrying out this modification of the present invention, a suitable regenerating gas and the spent catalyst are passed upwardly through a catalyst regenerating vessel under the conditions described above to maintain a concentration of at least about 3% by volume of solid material in the regenerating zone. For example, in the regeneration of spent cracking catalysts of the type described above, such catalysts may be passed with oxidizing gases through a catalyst reaction vessel maintained at a temperature sufficiently high to cause combustion of carbonaceous materials deposited on the catalyst but not high enough to reduce materially the activity of the catalyst.

The application of this invention to the catalytic cracking of hydrocarbon oil and to the regeneration of the cracking catalysts will be described in relation to Fig. 3 of the drawings which is a diagrammatic illustration in partial sectional elevation of an apparatus suitable for carrying out such a process and indicates the flow of materials therethrough.

Figure 3:
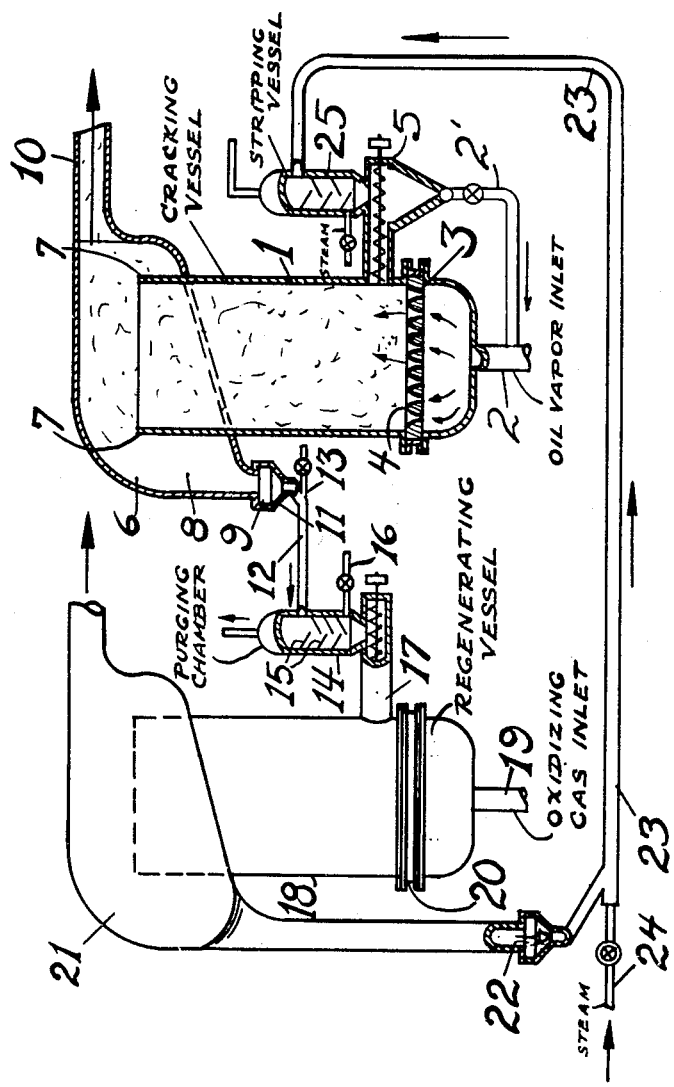

Referring to Fig. 3, the oil to be cracked is introduced in vapor form and with or without other diluent gases such as steam, hydrogen, etc., into the cracking vessel I through line 2. Prior to introduction the oil is preheated to the required cracking temperature by suitable heating and vaporizing equipment which, for purpose of simplicity, is not shown on the drawing. In this portion of the process, steam, hydrogen or other diluent may be added to aid in vaporization and/or to improve the catalytic process. The oil used may be any hydrocarbon oil capable of vaporization without substantial coking and may be either synthetically prepared as by reaction of carbon monoxide and hydrogen or by liquefaction or destructive hydrogenation of carbonaceous materials or it may be of natural origin such as petroleum oil fractions and products obtained from mineral oils by cracking, solvent extraction, destructive hydrogenation and combinations of such treatments. Petroleum gas oil and heavy naphtha fractions are examples of suitable feed stocks.

The oil vapors with diluents, if present, are preheated to the desired reaction temperature, such as for example from 600° F. to 1200° F., and are introduced through line 2 and pass upwardly through a perforated plate 3 into the reaction zone. The plate 3 is preferably provided with a number of openings 4, each of which is in the form of a cylinder at least 10 to 20 diameters in length which connects at its upper end with a Venturi expander section which changes progressively upward into a square section at the upper surface of the plate. Each side of each expander section is preferably contiguous with a side of an adjacent expander section or with the shell of the reaction chamber, thereby leaving no flat surface on the top of the plate 3.

A suitable cracking catalyst is supplied continuously to the reaction vessel by any suitable means such as a screw conveyor 5. The catalyst may be mixed with the gasiform material passing through line 2 and introduced into the bottom of vessel I as a suspension. Valved bypass line 2' leading from conveyor 5 to inlet line 2 is provided for conducting stripped catalyst to line 2 for suspending the catalyst in the vapors passing to vessel I. The screw conveyor 5 is preferably stopped when line 2' is used. This catalyst may be any of the known solid materials capable of effecting the desired conversion such as the active or activated clays or synthetic catalysts, such as the synthetic absorbent gels consisting principally of silica, alumina, magnesia or of mixtures of such materials such as plural gels of any two or more of such components; also, silica mixed with activated alumina, silica gel impregnated with soluble aluminum salts such as aluminum nitrate and activated before using by driving off oxides of nitrogen, and other powdered or granular materials which promote the cracking of hydrocarbons. The catalysts may be in powdered, granular or molded form and is preferably in the form of particles of very small size. While catalyst particles as large as 10 mesh or larger may be used, much smaller sizes are preferred and the catalyst is preferably ground to a fine powder having a particle size from 200 to 400 standard mesh or even finer. The catalyst may also be supplied to the reaction zone as a fluidized powder, mixed with a suitable diluent or reagent gas such as steam, nitrogen, hydrogen, or the hydrocarbons being treated, or as a suspension in such gas or vapor. The catalyst is preferably preheated substantially to the reaction temperature before it is passed into the reaction zone.

The rate of supply of catalyst and vapors or gases to the reaction vessel should be adjusted, as described above, to maintain a concentration of at least about 3% by volume of catalyst in the reaction zone. In the apparatus illustrated, this zone is the space bounded by the plate 3, the vertical walls I of the reaction vessel and the plane of the top 7 of this vertical wall, the overflow space being excluded. While the dimensions of the reaction vessel may vary widely, the reaction zone should preferably be of sufficient height to provide a time of exposure of the oil vapor therein between about one and one-half to one hundred seconds. A number of reaction vessels may be used in series if it is desired to operate at high gas velocities and long times of contact which would require a single reactor of impracticable dimensions. The reaction vessel may be operated at any desired pressure suitable for cracking, either subatmospheric or superatmospheric, pressures up to about 20 atmospheres or higher being preferred when using catalysts of small particle size of the order of 200 mesh or smaller, in order to reduce the upward linear velocity of the oil vapors and to permit the use of reaction vessels of smaller size.

Under preferred conditions of operation, the reaction vessel is maintained at a pressure between about atmospheric and 50 lbs. gauge and the reaction temperature is maintained at about 800° to 950° F. for maximum cracking to gasoline constituents or at a temperature of about 600° to 800° F. for the conversion to aviation gasoline of optimum stability and anti-knocking characteristics. The catalyst to oil ratio in the feed will preferably be from about 1 to 6 parts by weight of catalyst per part of oil, the time of exposure of the oil in the reaction is preferably between about 10 and 50 seconds and of the catalyst is between about 15 seconds and 30 minutes, all conditions being interadjusted to secure about 20 to 80% conversion of the oil into gasoline constituents.

Any suitable means may be provided for withdrawing catalyst and vapors from the reaction zone and for separating the catalyst from the vapors withdrawn therewith. For example, in the apparatus illustrated, the reaction vessel 1 is provided with an enlarged upper section surrounded by an annular casing 6 which serves to reduce the upward velocity of the vapors and to permit separation of catalyst therefrom. The catalyst thus overflows at 7 into the annular space 8 and collects in the hopper 9 while the cracked vapors, largely free of catalyst, are drawn off through line 10. These vapors are preferably subjected to any suitable treatments for separation of catalyst therefrom such as by passing through cyclone separators and/or electrostatic separators maintained preferably at a sufficiently high temperature to avoid condensation of the vapors and are then passed to suitable condensing and fractionating equipment to separate the desired motor fuel fractions from any heavier fractions and tarry products. The total heavier fractions or any distillate fractions thereof may be heated and recycled, preferably with additional fresh oil vapors, to line 2 for further treatment.

The used catalyst is withdrawn from the hopper 9 through the valved outlet 11 and is passed by line 12, preferably with the aid of steam or other suitable inert gas, supplied at 13, to a stripping or purging chamber 14. This stripping chamber may be of any suitable design to accomplish separation of the oil vapors from the catalyst. It may be constructed and operated in a manner similar to the reaction vessel 1 or it may be designed to provide a countercurrent flow of the catalyst particles and a gaseous stripping medium. For example, the stripping chamber 14 may be provided with baffles 15 to expedite separation of the oil vapors from the catalyst. If desired, additional inert stripping medium such as nitrogen, steam or inert flue gas may be introduced into the catalyst at a point below the baffles by line 16.

The catalyst leaving the stripping chamber 14 is then passed by suitable means such as the screw conveyor 17 into a regenerating vessel 18 in which it is brought into contact with oxidizing gases. This regenerating vessel may also be of any suitable design and is preferably, as illustrated, of the same design as the reaction vessel 1. For example, an oxidizing gas, such as air or partially deoxygenated air or air diluted with flue gas or inert gases, is preferably heated to about 850° F. and is then passed into the regenerating vessel 18 through line 19 and upwardly through perforated plate 20 which may be of the same design as plate 3.

The regeneration of the catalyst involves an exothermic reaction which tends to raise the temperature of the catalyst substantially, the amount of heat liberated depending upon the amount of carbonaceous material on the catalyst and the concentration and volume of oxygen in the oxidizing gas. It is preferred to have the oxygen content of the gases so low that the temperature of the catalyst does not rise sufficiently to decrease its activity. The maximum permissible temperature varies with different catalysts and in some cases may range up to 1400° F. It is generally preferred to maintain a lower maximum temperature of the order of about 1000° F. particularly in the regeneration of synthetic catalysts. The extreme turbulence accompanying the operation according to the present invention is particularly advantageous in providing a very uniform temperature level throughout the regenerating vessel and local overheating of the catalyst is thus avoided. Where the catalyst contains so much carbonaceous material that its combustion to gaseous products would raise the temperature of the catalyst and the oxidizing gases above the desired maximum temperature, a number of regeneration vessels may be used in series, preferably with cooling of the catalyst between regenerating vessels to a temperature of about 850° F. Additional cooling gases may also be supplied to the reactor provided that the total amount of oxidizing and cooling gases does not require a vapor velocity above the maximum permissible, in proportion to the catalyst feed rate, to maintain at least 3% by volume of solid catalyst in the regenerating zone. Heat may also be withdrawn from the regenerating zone by placing therein heat exchanger surfaces such as cooling tubes through which water or steam or the feed stock in liquid or vapor phase is circulated.

The regenerated catalyst is separated from the oxidizing gases in the enlarged annular space 21 and passes into the hopper 22. This regenerated catalyst is then preferably treated with suitable stripping gases or by other means to separate the oxidizing gases therefrom before it is permitted to again come in contact with hydrocarbon vapors. For example, it may be returned by line 23, preferably with the aid of steam supplied at 24 to a stripping vessel 25 which may be of the same design as the stripping vessel 14. The stripped or purged regenerated catalyst, freed of oxidizing gases, is then supplied from the bottom of the stripping vessel 25 to the screw conveyor 5. Any additional catalyst required for make-up may also be supplied either to the screw conveyor 17, to line 23 or to the screw conveyor 5, depending upon the desirability of treating the fresh catalyst with oxidizing or purging gases.

While the apparatus has been described with particular reference to the catalytic cracking of hydrocarbon oils to which it is particularly adaptable, it will be understood that in its broader aspect it will have a more general application such as for carrying out other types of high temperature hydrocarbon reactions such as reforming and other treatments of hydrocarbon vapors in the presence of hydrogen at ordinary atmospheric to high pressures of the order of 20 to 100 atmospheres or more, with or without net consumption of hydrogen, also for desulfurization, alkylation, polymerization, etc. Powdered or otherwise finely divided catalysts of suitable activity for the intended reaction will be used in each process, as will be understood. The apparatus also has particular application to the coking of heavy oil vapors in the presence of a relatively inert adsorbent powder such as pumice or spent clay. In such cases the adsorbent material will have little if any catalytic activity but will serve as an adsorbent for the coke formed during the visbreaking or coking operation which coke may later be burned off from the inert material in a regenerating circuit such as shown in Fig. 3 of the drawings.

For example, hydrocarbon oil vapor may be subjected to treatment with hydrogen in the processes and apparatus described above for the purpose of refining, hydroforming, or destructive hydrogenation of the oils. The invention is especially suitable for the hydroforming of hydrocarbon oil fractions boiling substantially in the gasoline range, i. e., between about 100° and 500° F., for the purpose of producing improved gasoline of low knocking characteristics superior to those of the initial material. The feed stock may be derived from petroleum oil or coal or other carbonaceous materials, by distillation, cracking, destructive hydrogenation or liquefaction or it may be produced by synthetic processes such as by the polymerization of unsaturated hydrocarbon gases or the reaction of hydrogen and carbon monoxide. The hydroforming process is generally conducted at a reaction temperature between 900° and 1000° F., and a pressure between about 50 and 750 pounds per square inch. The hydrogenating gas, containing about 20 to 90 mol per cent of hydrogen and preferably about 40 to 70 mol percent, is passed with the oil vapor through the reaction chamber at a rate between about 1500 and 10,000 cu. ft. per barrel of oil, and is advantageously recycled after suitable treatment to maintain the hydrogen concentration within the desired limits. The oil feed rate should be between about 0.2 and 5.0 volumes of liquid oil per volume of reaction space per hour, preferably between 0.2 and 2.0 v./v./hr.

The hydrogenating catalysts are supplied in finely divided form to the reaction vessel either separately from the gases or in admixture with the hydrogenating gases or the oil vapors or both, which may also be mixed. The preferred catalytic materials are oxides and sulfides of metals of groups II, IV, V, VI and VIII of the periodic system, especially the oxides and sulfides of molybdenum, chromium, tungsten, vanadium, cobalt and nickel. These catalysts may be used alone, in combination or mixtures with each other, or in combination with carriers such as natural and activated clays, aluminum oxide, alumina gels, peptized alumina, bauxite and the like. The catalysts may be prepared by mechanical mixing of the various ingredients, by impregnating the carrier with solutions of salts of the desired metals, and then heating to convert the salts to the oxides, or by co-precipitating hydroxides of the various ingredients. The preferred catalysts consist of aluminum oxide and from 1 to 50% of the active metal constituent.

In carrying out this process, the catalyst is used until (1) the consumption of hydrogen becomes appreciable, or (2) the octane number of the product falls below the level which the particular catalyst used is known to be capable of maintaining, whichever of these things occurs first. Ordinarily, the octane number of the product will fall below the desired level before there ceases to be a net production of free hydrogen. The catalyst is then regenerated when this occurs and is then returned to the process. The catalyst generally undergoes loss in activity in such a process at such a slow rate that it may be used repeatedly before regeneration is necessary. This may be accomplished in any suitable manner, for example, the catalyst may be passed through a number of reaction vessels in series, with the gases and vapors to be treated being passed through such vessels in either series or parallel or the process may be conducted continuously in a single reactor or a series of reactors with separation of catalyst and oil vapors only at the exit of the last reactor in the series, by recycling the major portion of the catalyst without regeneration, and withdrawing for regeneration only sufficient of the catalyst to maintain the activity of the whole at the desired level. Ordinarily, when operating with a single reaction vessel, from one half to three fourths or more of the total catalyst leaving the reaction vessel may be recirculated without regeneration in such a process.

The regeneration of such hydroforming catalysts is preferably conducted with oxidizing gases at a temperature between about 650° and 900° F. with precautions to avoid a maximum catalyst temperature above about 1200° F.

In this hydroforming process it is not necessary to add hydrogen from an extraneous source, once the process is started, as the hydrogen produced in the process and that initially added may be continuously recycled.

Having thus described the specific embodiment of the invention it will be understood that other modifications and variations have come within the spirit and scope thereof. It will be also understood that it is not the intention to unnecessarily restrict the invention or dedicate any novel features thereof.

We claim:

1. A method of operating a catalytic conversion system which comprises introducing a stream of hydrocarbons into the lower portion of an enlarged reaction zone, introducing finely divided catalyst into said reaction zone, passing the hydrocarbons in vapor form upwardly through the reaction zone at a velocity sufficient to carry overhead from said zone substantially all of the catalyst particles therein contained, maintaining the rate of introduction of the catalyst thereto sufficient to provide a mobile, turbulent, substantially liquid-like suspension of catalyst and vapor in the reaction zone having a catalyst concentration of upwards of 3% by volume, withdrawing vaporous conversion products from the upper end of the reaction zone, withdrawing catalyst containing entrained vapors from the reaction zone, stripping the catalyst to remove entrained vapors therefrom, introducing the stripped catalyst into an enlarged regeneration zone, passing regeneration gas upwardly through the regeneration zone at a velocity sufficient to carry overhead from said zone substantially all of the catalyst particles contained therein, maintaining the rate of introduction of catalyst to said regeneration zone sufficient to provide a mobile, turbulent, substantially liquid-like suspension of catalyst and regeneration gas in the regeneration zone having a catalyst concentration upwards of 3% by volume, withdrawing regenerated catalyst from the regeneration zone and returning regenerated catalyst to the reaction zone.

2. The method of operating a catalytic conversion system which comprises continuously feeding hydrocarbon vapor and powdered catalyst to an enlarged conversion zone contained in a conversion vessel, the vapor passing upwardly through said zone, while adjusting the catalyst feed rate to and the velocity of vapor through said conversion zone to maintain therein a concentrated, turbulent, substantially liquid-like suspension of catalyst in vapor containing at least 3% by volume of catalyst particles from which catalyst is continuously carried overhead by said vapor, said vapor velocity being so great as to preclude the maintenance of the concentration of said suspension in said zone in the absence of continuous feed of catalyst thereto, maintaining said conversion zone at a conversion temperature, continuously withdrawing from said vessel, at a point above said concentrated suspension, a stream of converted hydrocarbons largely free from catalyst, continuously separating catalyst from vapors between said concentrated suspension and said point of vapor withdrawal, continuously discharging catalyst from said conversion zone at a rate corresponding to the rate of catalyst feed thereto, continuously feeding discharged catalyst and regenerating gas to an enlarged regeneration zone contained in a regeneration vessel, the gas passing upwardly through said regeneration zone, while adjusting the velocity of said regenerating gas through and the feed rate of said catalyst to said regeneration zone to maintain therein a concentrated, turbulent, substantially liquid-like suspension of catalyst in gas containing at least 3% by volume of catalyst particles from which catalyst is continuously carried overhead by said gas, the gas velocity being so great as to preclude the maintenance of the concentration of said suspension in said zone in the absence of continuous feed of catalyst thereto, maintaining said regeneration zone at a regeneration temperature, continuously withdrawing from said regeneration vessel, at a point above said concentrated suspension, a stream of gas largely free from catalyst, continuously separating catalyst from gas between said concentrated suspension and said point of gas withdrawal, continuously discharging regenerated catalyst from said regeneration zone at a rate corresponding to the rate of catalyst feed thereto, continuously returning regenerated catalyst to said conversion zone and stripping vaporous material from said catalyst between the conversion zone and the regeneration zone.

3. The process defined in claim 2 wherein the liquid-like suspensions contain upwards of 10% by volume of catalyst.

4. A process defined in claim 2 wherein the major portion of the catalyst is capable of passing a 100 mesh screen, the velocity of the vapors passing upwardly through the conversion zone and of the regeneration gas through the regeneration zone is between about .51 and about 7.8 feet per second.

5. The process defined in claim 2 wherein the vapors and regeneration gas introduced into the reaction and regeneration zone respectively are distributed to a plurality of spaced points arranged over a substantial cross-sectional area of the reaction and regeneration zones.

6. The invention defined in claim 2 wherein the liquid-like suspension in the reaction zone and the regeneration zone contains between about 3% and about 15% by volume of catalyst.

7. A method of operating a catalytic conversion system which comprises introducing hydrocarbons into the lower portion of an enlarged reaction zone superimposed by a separating zone, introducing finely divided catalyst into the reaction zone, passing the hydrocarbons in vapor form upwardly through the reaction zone at a velocity sufficient to carry overhead from said reaction zone substantially all of the catalyst particles therein contained, maintaining the rate of introduction of the catalyst thereto sufficient to provide a mobile, highly turbulent, substantially liquid-like suspension of catalyst and vapor within the reaction zone containing at least 3% by volume of catalyst, separating catalyst from vaporous conversion products in said separating zone, withdrawing vaporous conversion products largely free of catalyst from said separating zone, withdrawing catalyst from said separating zone and reaction zone, stripping the catalyst so withdrawn after removal from the reaction zone, introducing the stripped catalyst into the lower portion of an enlarged regeneration zone superimposed by a separating zone, passing regeneration gas upwardly through said regeneration zone at a velocity sufficient to carry overhead from said regeneration zone substantially all of the catalyst particles contained therein, maintaining the rate of introduction of the stripped catalyst to said regeneration zone sufficient to provide a mobile, turbulent, substantially liquid-like suspension of catalyst in said regeneration zone containing at least 3% by volume of catalyst, separating regenerated catalyst from regeneration gas in said second named separating zone, removing regeneration gas largely free of catalyst from the upper end of said second named separating zone, withdrawing regenerated catalyst from said second named separating zone and said regeneration zone and returning regenerated catalyst to said reaction zone.

WARREN K. LEWIS.
EDWIN R. GILLILAND.

REFERENCES CITED

The following references are of record in the file of this patent:

UNITED STATES PATENTS

| Number | Name | Date |
|---|---|---|
| 788,741 | Trump | May 2, 1905 |
| 1,687,118 | Winkler | Oct. 9, 1928 |
| 1,873,783 | Osterstrom et al. | Aug. 23, 1932 |
| 1,984,380 | Odell | Dec. 18, 1934 |
| 2,231,424 | Huppke | Feb. 11, 1941 |
| 2,264,438 | Gaylor | Dec. 2, 1941 |
| 2,289,329 | Prickett | July 7, 1942 |
| 2,305,569 | Degnen | Dec. 15, 1942 |

FOREIGN PATENTS

| Number | Country | Date |
|---|---|---|
| 533,037 | Germany | Aug. 27, 1931 |